(12) United States Patent
Jo et al.

(10) Patent No.: US 10,916,776 B2
(45) Date of Patent: Feb. 9, 2021

(54) POSITIVE ELECTRODE ACTIVE MATERIAL PARTICLES AND SECONDARY BATTERY INCLUDING SAME

(71) Applicant: LG Chem, Ltd., Seoul (KR)

(72) Inventors: Chi Ho Jo, Daejeon (KR); Ji Hoon Ryu, Daejeon (KR); Min Suk Kang, Daejeon (KR); Sun Sik Shin, Daejeon (KR); Wang Mo Jung, Daejeon (KR)

(73) Assignee: LG Chem, Ltd.

(*) Notice: Subject to any disclaimer, the term of this patent is extended or adjusted under 35 U.S.C. 154(b) by 108 days.

(21) Appl. No.: 15/554,287

(22) PCT Filed: Jun. 30, 2016

(86) PCT No.: PCT/KR2016/007000
§ 371 (c)(1),
(2) Date: Aug. 29, 2017

(87) PCT Pub. No.: WO2017/003197
PCT Pub. Date: Jan. 5, 2017

(65) Prior Publication Data
US 2018/0053940 A1    Feb. 22, 2018

(30) Foreign Application Priority Data

Jun. 30, 2015   (KR) .................. 10-2015-0092949
Jun. 28, 2016   (KR) .................. 10-2016-0080564

(51) Int. Cl.
*H01M 4/62*        (2006.01)
*H01M 4/505*       (2010.01)
(Continued)

(52) U.S. Cl.
CPC ............ *H01M 4/628* (2013.01); *C01G 51/42* (2013.01); *C01G 51/66* (2013.01);
(Continued)

(58) Field of Classification Search
None
See application file for complete search history.

(56) References Cited

U.S. PATENT DOCUMENTS

2001/0031397 A1    10/2001   Kweon et al.
2011/0042609 A1*   2/2011    Park .................. H01M 4/366
                                                      252/182.1
(Continued)

FOREIGN PATENT DOCUMENTS

CN    101740752 A    6/2010
CN    103548189 A    1/2014
(Continued)

OTHER PUBLICATIONS

Search report from International Application No. PCT/KR2016/007000, dated Oct. 4, 2016.
(Continued)

*Primary Examiner* — Alix E Eggerding
(74) *Attorney, Agent, or Firm* — Lerner, David, Littenberg, Krumholz & Mentlik, LLP

(57) ABSTRACT

The present invention relates to positive electrode active material particles and a secondary battery including the same and provides positive electrode active material particles comprising: a core including a first lithium transition metal oxide; and a shell surrounding the core, wherein the shell has a form in which metal oxide particles are embedded in a second lithium transition metal oxide, and at least a part of the metal oxide particles is present by being exposed at a surface of the shell. The positive electrode active material particles according to the present invention prevent a transition metal and an electrolyte from causing a side reaction by exposing a part of a metal oxide, having low reactivity, at a surface of the active materials, thereby improving safety and lifespan. As the electrical conductivity of the active (Continued)

materials becomes lower, excellent stability can be maintained even at high temperature and in battery-breakdown situations.

14 Claims, 3 Drawing Sheets

(51) Int. Cl.
  H01M 4/04      (2006.01)
  H01M 4/1391    (2010.01)
  C01G 51/00     (2006.01)
  H01M 4/36      (2006.01)
  H01M 4/525     (2010.01)
  H01M 10/0525   (2010.01)
  H01M 4/02      (2006.01)

(52) U.S. Cl.
  CPC ....... H01M 4/0471 (2013.01); H01M 4/1391 (2013.01); H01M 4/366 (2013.01); H01M 4/505 (2013.01); H01M 4/525 (2013.01); H01M 4/62 (2013.01); *C01P 2004/04* (2013.01); *C01P 2004/61* (2013.01); *C01P 2004/84* (2013.01); *C01P 2006/40* (2013.01); *H01M 10/0525* (2013.01); *H01M 2004/021* (2013.01); *H01M 2004/028* (2013.01); *H01M 2220/20* (2013.01)

(56) References Cited

U.S. PATENT DOCUMENTS

| | | | | |
|---|---|---|---|---|
| 2012/0225357 | A1* | 9/2012 | Jeoung | H01M 4/13 429/231.95 |
| 2012/0264018 | A1 | 10/2012 | Kong et al. | |
| 2013/0183579 | A1 | 7/2013 | Kim et al. | |
| 2014/0342229 | A1* | 11/2014 | Kwak | C01B 25/455 429/219 |
| 2015/0104708 | A1 | 4/2015 | Bi et al. | |
| 2015/0194662 | A1 | 7/2015 | Yang et al. | |
| 2016/0164078 | A1 | 6/2016 | Hong et al. | |

FOREIGN PATENT DOCUMENTS

| | | | |
|---|---|---|---|
| CN | 103715423 | A | 4/2014 |
| CN | 104009209 | A | 8/2014 |
| CN | 104106161 | A | 10/2014 |
| JP | 2001256979 | A | 9/2001 |
| JP | 2008041570 | A | 2/2008 |
| JP | 2010251194 | A | 11/2010 |
| KR | 20120100022 | A | 9/2012 |
| KR | 101274829 | B1 | 6/2013 |
| KR | 20130084616 | A | 7/2013 |
| KR | 20140067508 | A | 6/2014 |
| KR | 20150021809 | A | 3/2015 |

OTHER PUBLICATIONS

Shim, et al., "Characterization of Spinel LixCo2O4-Coated LiCoO2 Prepared with Post-Terminal Treatment as a Cathode Material for Lithium Ion Batteries." Chemistry of Materials, 2015, vol. 27, pp. 3273-3279.

Kosova, N. V., et al., "'Core-shell' cathode material for lithium-ion batteries prepared via mechanochemical route."CDS Translations, vol. 16, No. 42, 2009, pp. 21-29.

Kweon, Ho-Jin, et al., "Modification of LixNi1-yCoyO2 by applying a surface coating of MgO." Journal of Power Sources, vol. 88, 2000, pp. 255-261.

Julien et al., Smart materials for energy storage in Li-ion batteries, AIMS Materials Science, Published Jan. 2016, pp. 1-12, vol. 3, Issue 1.

Vadivel et al., High-performance Li-ion Batteries using Nickel-rich Lithium Nickel Cobalt Aluminium Oxide-Nanocarbon Core-Shell Cathode: In operando X-ray diffraction, ACS Applied Materials and Interfaces, Web Publication Aug. 2019, pp. 1-48, American Chemical Society.

Chinese Search Report for Application No. CN201680016409 dated Dec. 26, 2019.

Chinese Search Report for Application No. 201680016409.X dated Jun. 12, 2020, 2 pages.

Xiong, et al., "Enhanced Electrochemical properties of lithium-reactive V2O5 coated on the LiNi0.8Co0.1O2 cathode material for lithium ion batteries at 60oC," Journal of Materials Chemistry A, Nov. 8, 2012, pp. 1284-1288, vol. 1.

* cited by examiner

【FIG. 1】
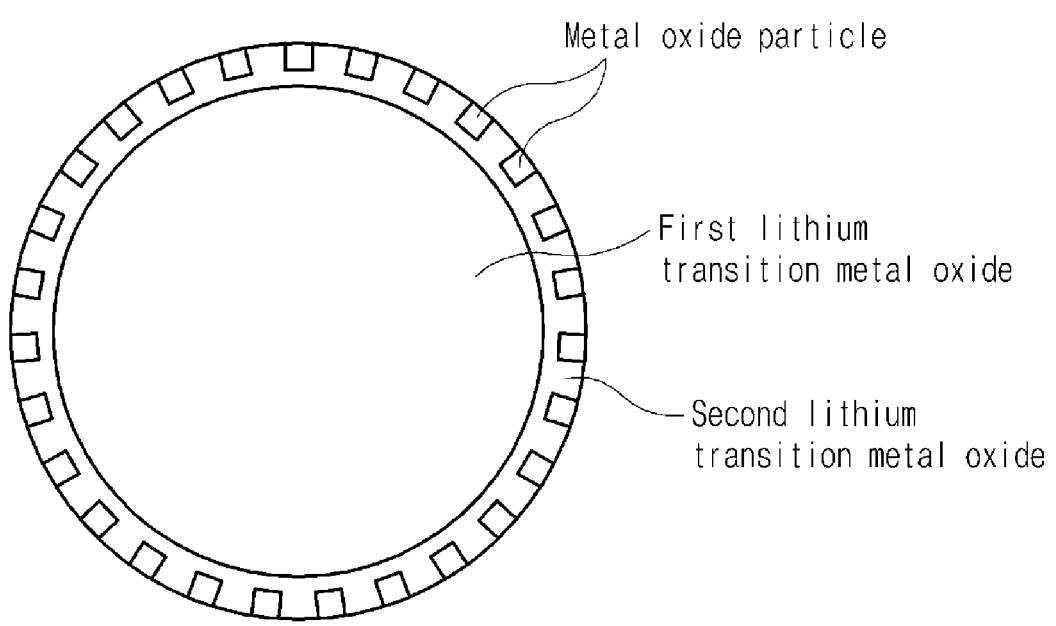

[FIG. 2]
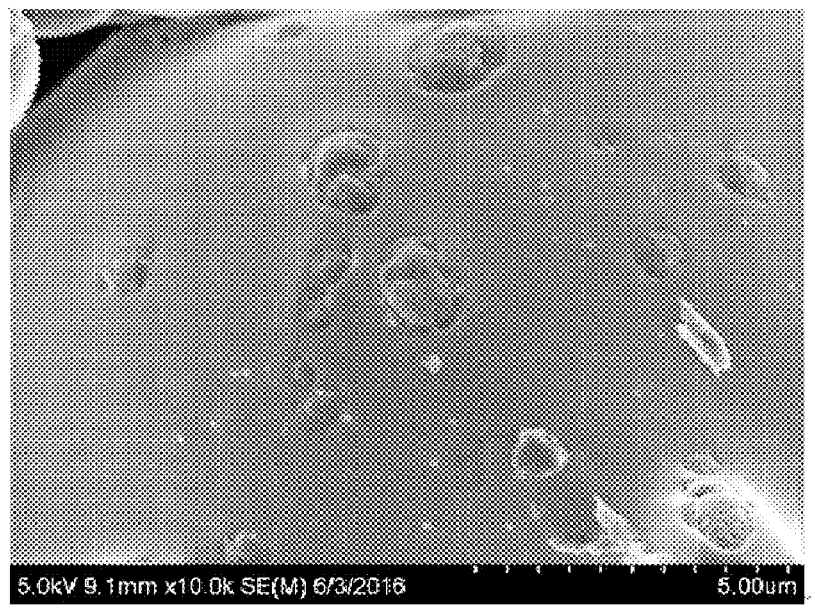
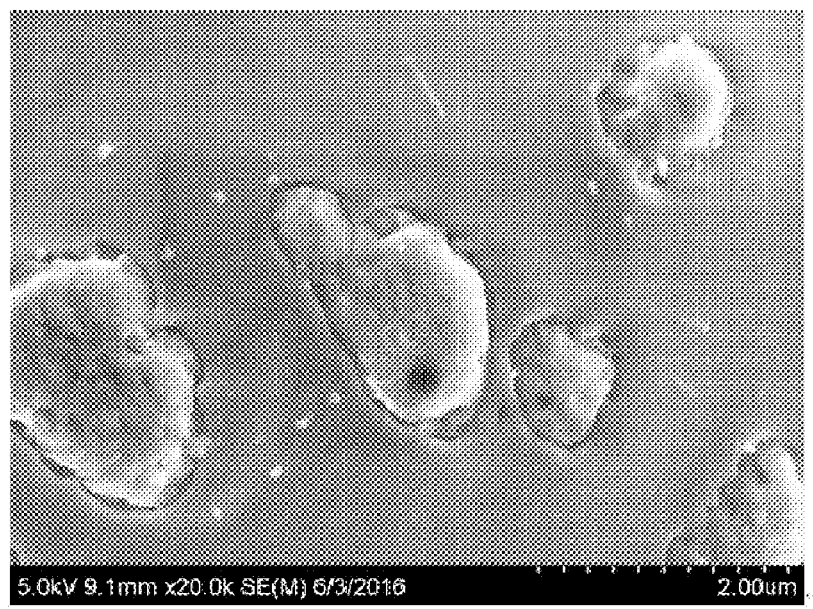

[FIG. 3]
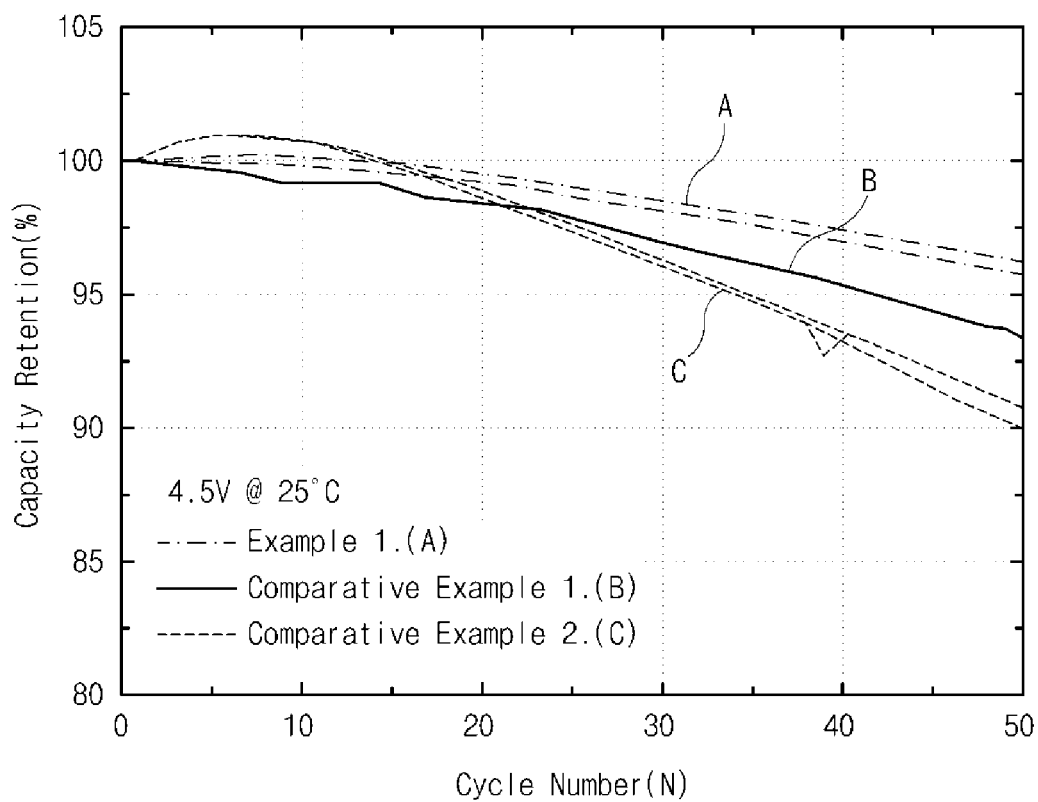

POSITIVE ELECTRODE ACTIVE MATERIAL PARTICLES AND SECONDARY BATTERY INCLUDING SAME

CROSS-REFERENCE TO RELATED APPLICATION

The present application is a national phase entry under 35 U.S.C. § 371 of International Application No. PCT/KR2016/007000 filed Jun. 30, 2016, which claims priority from Korean Patent Application No. 10-2015-0092949, filed Jun. 30, 2015 and Korean Patent Application No. 10-2016-0080564, filed Jun. 28, 2016, all of which are hereby incorporated herein by referenced.

TECHNICAL FIELD

The present invention relates to positive electrode active material particles and a secondary battery including the same.

BACKGROUND ART

The use of a lithium secondary battery has been applied in various fields. Recently, a small-sized lithium secondary battery, which is a power source that can drive portable electronic communication devices such as camcorders, mobile phones, notebook PCs and the like, has almost replaced batteries of portable devices requiring high performance, and occupies a firm position as a power supply unit. Also, the development of medium- to large-sized lithium secondary batteries for as a hybrid electric vehicle (HEV), an electric vehicle (EV) and the like, which use high-output characteristics, has been actively progressing in recent years. In addition, research and development is being actively conducted in Korea, Japan, Europe, the USA and the like in relation to various application fields of a lithium secondary battery as a power supply of a power tool, a vessel, an artificial satellite, a military radio and a weapon system and an uninterruptible power supply (UPS) as an eco-friendly power source.

A lithium secondary battery is an energy storage device having high energy and power, and has advantages of high capacity or operating voltage compared to other batteries, but has the risk of explosion or fire due to safety problems of a battery caused by high energy. In particular, since a hybrid electric vehicle and the like, which are in the spotlight in recent years, require high energy and output characteristics, safety can be seen as more important.

As a conventional technology related to a lithium secondary battery with improved stability, Korean Registered Patent No. 10-1274829 provides a secondary battery with improved lifetime characteristics. Specifically, there is provided a positive electrode in which an oxide is formed at a hydroxyl group (—OH) of a positive electrode mixture including a positive electrode active material, a conductive material and a binder, and the oxide is formed to have a thickness of 1 to 50 nm. However, when a positive electrode is coated with a metal oxide as described above, lithium ions are not deintercalated and intercalated freely, and thus the performance of a secondary battery is degraded.

Accordingly, the present inventors verified that an active material having chemically excellent stability can be provided by embedding a metal oxide consisting of elements having low stability in a surface of a positive electrode active material in studies on a positive electrode active material having excellent safety and lifetime characteristics, and completed the present invention.

[Prior-Art Document]
(Patent Document 1) Korean Registered Patent No. 10-1274829

DISCLOSURE

Technical Problem

It is an aspect of the present invention to provide positive electrode active material particles having improved stability and lifetime characteristics because a side reaction is prevented by embedding a metal oxide in a surface of a lithium transition metal oxide and thus reducing a reaction area of the lithium transition metal oxide and an electrolyte.

In addition, it is another aspect of the present invention to provide a secondary battery including positive electrode active material particles, a battery module and a battery pack.

Technical Solution

In order to accomplish the objects, the present invention provides positive electrode active material particles which include a core including a first lithium transition metal oxide and a shell surrounding the core, wherein the shell is in a form in which metal oxide particles are embedded in a second lithium transition metal oxide, and at least a part of each of the metal oxide particles is exposed at a surface of the shell.

In addition, the present invention provides a secondary battery, which includes a positive electrode coated with a positive electrode mixture including the positive electrode active material particles, a negative electrode coated with a negative electrode mixture including a negative electrode active material and an electrolyte; a battery module and a battery pack including the secondary battery.

Advantageous Effects

Positive electrode active material particles according to the present invention can prevent a transition metal and an electrolyte from causing a side reaction by exposing a part of a metal oxide having low reactivity at a surface of the active material, thus safety and lifetime characteristics are improved. Also, as the electrical conductivity of the active material is decreased, excellent stability can be maintained even at high temperature and in battery-breakdown situations.

DESCRIPTION OF DRAWINGS

FIG. 1 is a schematic diagram illustrating positive electrode active material particles according to an embodiment of the present invention.

FIG. 2 shows images of positive electrode active material particles according to an embodiment of the present invention.

FIG. 3 is a graph illustrating capacity retentions according to Example 1 and Comparative Examples 1 and 2 of the present invention.

MODES OF THE INVENTION

Hereinafter, the present invention will be described in further detail to help in understanding the present invention.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

Terms used herein are merely used to describe exemplary embodiments, and there is no intent to limit the present invention. Singular expressions, unless defined otherwise in context, include plural expressions.

In the present invention, it should be appreciated that the terms "comprise", "include" or "have" are merely intended to indicate that features, numbers, steps, components, or combinations thereof are present, and not intended to exclude a possibility that one or more other features, numbers, steps, components, or combinations thereof will be present or added.

A conventional lithium transition metal oxide used as a positive electrode active material has a problem in which a transition metal in the lithium transition metal oxide is oxidized at a positive electrode upon charging with high voltage (for example, when $LiCoO_2$ is used as a positive electrode active material, oxidation from $Co^{+3}$ to $Co^{+4}$ occurs), and a side reaction of the oxidized transition metal and an electrolyte is caused to lower surface stability and lifetime characteristics.

Accordingly, in the present invention, the disadvantages of the conventional lithium transition metal oxide are compensated to improve the stability and lifetime characteristics of a battery.

Positive electrode active material particles according to an embodiment of the present invention include a core including a first lithium transition metal oxide and a shell surrounding the core. Here, the shell may be in a form in which metal oxide particles are embedded in a second lithium transition metal oxide, and at least a part of each of the metal oxide particles may be exposed at a surface of the shell.

FIG. 1 is a schematic diagram illustrating positive electrode active material particles according to an embodiment of the present invention. Referring to FIG. 1, the positive electrode active material may be in a form in which some of the metal oxide particles in the shell are exposed at a surface of the shell, and particularly, at least a part of each of the metal oxide particles in the shell is exposed outside the surface of the shell. FIG. 2 shows images of positive electrode active material particles according to an embodiment of the present invention. Referring to FIG. 2, it can be seen that at least a part of each of the metal oxide particles is exposed at a surface of the shell.

The positive electrode active material particles may have an average particle diameter ($D_{50}$) of 5 to 25 μm, and the core may have an average particle diameter ($D_{50}$) of 4 to 25 μm. The shell may have a thickness of 100 to 300 nm, and the metal oxide particles may have an average particle diameter ($D_{50}$) of 5 to 200 nm.

As such, since the shell is in a form in which metal oxide particles with low reactivity with an electrolyte are embedded in a surface of a lithium transition metal oxide, a portion where the lithium transition metal oxide comes in direct contact with the electrolyte is small, and thus it is possible to reduce a problem in which a transition metal is oxidized to cause a side reaction of the oxidized transition metal and an electrolyte. Also, unlike the present invention, when a metal oxide is simply applied onto a surface of an active material, the coating is likely to be detached from active material particles by physical impact and chemical reactions. However, in the case of the present invention, since a metal oxide is embedded in a surface of an active material, it is possible to maintain a solid form compared to when a metal oxide is simply applied to a surface of an active material.

Further, since the metal oxide is embedded in a surface of an active material in such a way that a part of the metal oxide is exposed at the surface, the electrical conductivity of the active material may be appropriately adjusted, and thus safety may be ensured at high temperature and in battery-breakdown situations. Specifically, when a battery is driven or evaluated at high temperature, heat is generated due to disconnection of a positive electrode and a negative electrode, and a separator is shrunk by accumulation of the heat. As a result, a disconnecting area is increased and thus heat generation (thermal runaway) may occur. If the electrical conductivity of the positive electrode is high when the positive electrode and the negative electrode are disconnected, a large amount of electric current flows at the moment of disconnection so that a larger amount of heat is generated and thus thermal runaway occurs more quickly, resulting in degradation in stability. Since the active material according to an embodiment of the present invention is present in a state in which a metal oxide is embedded in a surface thereof in such a way that a part of each metal oxide is exposed at the surface, low electrical conductivity may be maintained. Therefore, a small amount of electric current flows at the moment of disconnection so that heat generation does not significantly occur and thus the occurrence of thermal runaway may be delayed, resulting in improvement of stability.

When the shell has a thickness of less than 100 nm, a large number of metal oxide particles are exposed at a surface of the shell, and thus the electrical conductivity of the positive electrode active material may be degraded. On the other hand, when the shell has a thickness of greater than 300 nm, metal oxide particles are not exposed at a surface of the shell, and thus a side reaction of an electrolyte and a positive electrode active material may be caused.

In addition, when the metal oxide has an average particle diameter ($D_{50}$) of less than 5 nm, a metal oxide is embedded inside a shell, is not exposed at a surface of the shell, and thus a side reaction of an electrolyte and a positive electrode active material may be caused. On the other hand, when the metal oxide has an average particle diameter ($D_{50}$) of greater than 200 nm, a large number of each metal oxide particles are exposed at a surface of the shell, and thus electrical conductivity may be degraded.

The first lithium transition metal oxide in the core and the second lithium transition metal oxide in the shell may be one or more selected from the group consisting of lithium-cobalt-based oxide, lithium-manganese-based oxide, lithium-nickel-manganese-based oxide, lithium-manganese-cobalt-based oxide and lithium-nickel-manganese-cobalt-based oxide, and particularly, one or more selected from the group consisting of $LiCoO_2$, $LiNiO_2$, $LiMnO_2$, $LiMn_2O_4$, $Li(Ni_aCo_bMn_c)O_2$ (here, $0<a<1$, $0<b<1$, $0<c<1$ and $a+b+c=1$), $LiNi_{1-Y}Co_YO_2$, $LiCo_{1-Y}Mn_YO_2$, $LiNi_{1-Y}Mn_YO_2$ (here, $0\leq Y<1$), $Li(Ni_aCo_bMn_c)O_4$ (here, $0<a<2$, $0<b<2$, $0<c<2$ and $a+b+c=2$), $LiMn_{2-z}Ni_zO_4$, and $LiMn_{2-z}Co_zO_4$ (here, $0<Z<2$), but the present invention is not limited thereto. An average composition of the first lithium transition metal oxide may be the same as an average composition of the second lithium transition metal oxide.

The metal oxide particles may be provided by one or more selected from the group consisting of $Al_2O_3$, $TiO_2$, $MgO$, MnO and ZrO, but the metal oxide is not limited thereto, and a metal oxide having low reactivity with an electrolyte may be appropriately selected and used.

In this case, metal atoms of the metal oxide particles may be included at 0.01 to 1.0 at % with respect to all atoms of the positive electrode active material particles, and the metal oxide particles may be included at 0.03 to 2.0 wt % with respect to the total weight of the positive electrode active material particles. A content of the metal atoms may be measured through an inductively coupled plasma (ICP) spectrometer and an X-ray fluorescence (XRF) analyzer, and particularly, may be preferably measured using an inductively coupled plasma emission spectrometer. A content of the metal oxide particles may be calculated based a value measured through an inductively coupled plasma emission spectrometer.

When the metal atoms are included at less than 0.01 at % and the metal oxide particles are included at less than 0.03 wt %, an area of a lithium transition metal oxide which can cause a side reaction together with an electrolyte increases, and thus lifetime characteristics and stability of a battery may be degraded. On the other hand, when the metal atoms are included at greater than 1.0 at % and the metal oxide particles are included at greater than 2.0 wt %, the electrical conductivity of a positive electrode active material is decreased, and thus battery efficiency may be degraded.

A method of preparing positive electrode active material particles according to an embodiment of the present invention may include mixing a lithium compound and a transition metal compound and calcining the resulting mixture to prepare a lithium transition metal oxide (step 1); and mixing the lithium transition metal oxide prepared in step 1, a lithium compound, a transition metal compound and a metal raw material in a weight ratio of 92 to 97:0.5 to 2:2 to 4:0.5 to 2 and calcining the resulting mixture at 550 to 850° C. for 3 to 10 hours (step 2).

Hereinafter, the method of preparing positive electrode active material particles according to the present invention will be described in detail for each step.

In the method of preparing positive electrode active material particles according to the present invention, in step 1, a lithium compound and a transition metal compound are mixed and calcined to prepare a lithium transition metal oxide.

In this case, the lithium compound and the transition metal compound may be any lithium compound and transition metal compound commonly used to prepare a positive electrode active material in the art. For example, the lithium compound may be one or more selected from the group consisting of $Li_2CO_3$, $LiNO_3$ and LiOH, and the transition metal compound may be one or more selected from the group consisting of an oxide, hydroxide, oxynitride, chloride and carbonate of a transition metal, but the present invention is not limited thereto. Meanwhile, the calcination may be performed at 800 to 1,150° C. for 5 to 20 hours.

In the method of preparing positive electrode active material particles according to the present invention, in step 2, the lithium transition metal oxide prepared in step 1, a lithium compound, a transition metal compound and a metal raw material are mixed in a weight ratio of 92 to 97:0.5 to 2:2 to 4:0.5 to 2 and calcined at 550 to 850° C. for 3 to 10 hours.

In step 2, the lithium compound and the transition metal compound are reacted to prepare a lithium transition metal oxide and simultaneously to prepare a metal oxide from the metal raw material, and thus a shell with a form in which a lithium transition metal oxide and a metal oxide are mixed may be prepared.

Further, since a thin shell may be prepared by limiting a weight ratio of precursors to a specific value, a part of each metal oxide may be exposed at a surface of the shell.

In this case, the lithium compound and the transition metal compound may be compounds used in step 1, and the metal raw material may be one or more selected from the group consisting of a carbonate, nitrate, oxalate, sulfate, acetate, citrate and chloride of a metal. Here, the metal may be one or more selected from the group consisting of Al, Ti, Mg, Mn and Zr.

In this case, in step 2, a weight ratio of a core (a lithium transition metal oxide), a lithium compound, a transition metal compound and a metal raw material may be 92 to 97:0.5 to 2:2 to 4:0.5 to 2. When a metal raw material is included at less than 0.5 wt %, a metal oxide is prepared with a small diameter, and thus a metal oxide is not exposed at a surface of a shell. On the other hand, when a metal raw material is included at greater than 2 wt %, a metal oxide is excessively exposed at a surface of a shell, and thus the electrical conductivity of a positive electrode active material may be degraded. Also, the calcination in step 2 may be performed at 550 to 850° C. for 3 to 10 hours. When the calcination may be performed at less than 550° C. or for less than 3 hours, the metal oxide is disposed only on a surface of a lithium transition metal oxide in the form of a coating. In this case, a solid form cannot be maintained compared to when a metal oxide is embedded in a surface, and the surface resistance of an obtained active material may be too high. When the calcination is performed at greater than 850° C. or for greater than 10 hours, the metal oxide is excessively diffused inside a lithium transition metal oxide, and thus the metal oxide is not exposed at a surface of the lithium transition metal oxide. In this case, a reaction area of the lithium transition metal oxide and an electrolyte is not reduced, and thus stability and capacity retention are decreased.

When step 2 is performed in the above weight ratio at the above calcining temperature, a positive electrode active material in which a part of each metal oxide is exposed at a surface of a lithium transition metal oxide may be prepared.

According to an embodiment of the present invention, there is provided a secondary battery which includes a positive electrode coated with a positive electrode mixture including the positive electrode active material particles, a negative electrode coated with a negative electrode mixture including a negative electrode active material, and an electrolyte.

The secondary battery according to the present invention includes the positive electrode active material particles, and the positive electrode active material particles can prevent a transition metal and an electrolyte from causing a side reaction by exposing a part of each metal oxide with low reactivity at a surface of an active material, and thus, safety and lifetime characteristics of the secondary battery are improved. Also, as the electrical conductivity of an active material is decreased, the secondary battery can maintain excellent stability even at high temperature and in battery-breakdown situations.

The positive electrode according to the present invention may be prepared, for example, by applying a positive electrode mixture prepared by mixing the positive electrode active material particles, a conductive material, a binder, a filler and a solvent such as N-methylpyrrolidone (NMP) or the like onto a positive electrode current collector, followed by drying and rolling.

The binder is added as a component that assists in bonding an active material and a current collector. Examples of such a binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene terpolymer (EPDM), sulfonated EPDM, styrene-butyrene rubber, fluorinated rubber, various copolymers and the like.

The filler is optionally used as a component for suppressing the expansion of a positive electrode, and is not particularly limited as long as it does not cause a chemical change in the battery and is a fibrous material. For example, the filler may be an olefin-based polymer such as polyethylene, polypropylene and the like; or a fibrous material such as glass fiber, carbon fiber and the like.

The positive electrode current collector is generally prepared with a thickness of 3 to 500 μm. Such a positive electrode current collector is not particularly limited as long as it does not cause a chemical change in the battery and has high conductivity. For example, the positive electrode current collector may be stainless steel, aluminum, nickel, titanium, calcined carbon, or aluminum or stainless steel whose surface is treated with carbon, nickel, titanium, silver or the like. The positive electrode current collector may have a fine uneven portion formed on its surface to increase the binding force of a positive electrode active material, and may be used in various forms such as a film, a sheet, a foil, a net, a porous body, a foaming body, a nonwoven fabric and the like.

The negative electrode may be prepared, for example, by applying a negative electrode mixture including a negative electrode active material onto a negative electrode current collector, followed by drying.

Such a negative electrode current collector is not limited as long as it does not cause a chemical change in the battery and has conductivity. For example, the negative electrode current collector may be copper, stainless steel, aluminum, nickel, titanium, calcined carbon, copper or stainless steel whose surface is treated with carbon, nickel, titanium, silver or the like, an aluminum-cadmium alloy or the like. Also, like the positive electrode current collector, the negative electrode current collector may have a fine uneven portion formed on its surface to increase the binding force of a negative electrode active material, and may be used in various forms such as a film, a sheet, a foil, a net, a porous body, a foaming body, a nonwoven fabric and the like.

The secondary battery according to the present invention may further include a separator. The separator is interposed between the positive electrode and the negative electrode, and is an insulating thin film having high ion permeability and mechanical strength. The separator generally has a pore diameter of 0.01 to 10 μm and a thickness of 5 to 300 μm. Such a separator may be, for example, a sheet or a nonwoven fabric made of an olefin-based polymer such as polypropylene; glass fiber, polyethylene or the like which have chemical resistance and hydrophobicity. When a solid electrolyte such as a polymer and the like is used as an electrolyte, the solid electrolyte may also act as a separator.

The electrolyte may be a lithium-salt-containing non-aqueous electrolyte. In this case, the lithium-salt-containing non-aqueous electrolyte is composed of a non-aqueous electrolyte and lithium salts. As the non-aqueous electrolyte, a non-aqueous organic solvent, an organic solid electrolyte, an inorganic solid electrolyte or the like is used.

The non-aqueous organic solvent may be, for example, an aprotic organic solvent such as N-methyl-2-pyrrolidinone, propylene carbonate, ethylene carbonate, butylene carbonate, dimethyl carbonate, diethyl carbonate, γ-butyrolactone, 1,2-dimethoxyethane, tetrahydroxy Franc, 2-methyltetrahydrofuran, dimethyl sulfoxide, 1,3-dioxolane, formamide, dimethylformamide, dioxolane, acetonitrile, nitromethane, methyl formate, methyl acetate, a phosphoric acid triester, trimethoxymethane, a dioxolane derivative, sulfolane, methylsulfolane, 1,3-dimethyl-2-imidazolidinone, a propylene carbonate derivative, a tetrahydrofuran derivative, ether, methyl propionate, ethyl propionate or the like.

The organic solid electrolyte may be, for example, a polyethylene derivative, a polyethylene oxide derivative, a polypropylene oxide derivative, a phosphoric acid ester polymer, poly agitation lysine, polyester sulfide, polyvinyl alcohol, polyvinylidene fluoride, a polymer including an ionic dissociable group or the like.

The inorganic solid electrolyte may be, for example, a nitride, a halide or a sulfate of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$ or the like.

The lithium salt is a material that is readily soluble in the non-aqueous electrolyte, and may be, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenylborate, an imide or the like.

In addition, in order to improve charge/discharge characteristics and flame retardancy, for example, pyridine, triethyl phosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. In some cases, the non-aqueous electrolyte may further include a halogen-containing solvent such as carbon tetrachloride, ethylene trifluoride and the like to impart incombustibility, and may further include carbon dioxide gas to improve high-temperature storage characteristics.

According to another embodiment of the present invention, there are provided a battery module including the secondary battery as a unit cell and a battery pack including the same. Since the battery module and the battery pack includes the secondary battery which exhibits stability and excellent battery characteristics at high temperature, the battery pack may be used as a power source for any one or more medium- to large-sized devices including a power tool, an electric vehicle (EV), an hybrid electric vehicle (HEV) a plug-in hybrid electric vehicle (PHEV) and a system for power storage.

Hereinafter, exemplary embodiments of the present invention will be described in detail so that those of ordinary skill in the art can carry out the present invention. However, it should be understood that the present invention can be implemented in various forms, and is not intended to limit the exemplary embodiments of the present invention.

Example 1 and Comparative Examples 1 and 2:
Preparation of Positive Electrode Active Material <Example 1> Preparation of Positive Electrode Active Material in which Metal Oxides are Embedded in Surface in Such a Way that Part of Metal Oxide is Exposed at Surface Step 1 (preparation of a core): 1 to 1.05 moles of $Li_2CO_3$ as a lithium compound and 1 mole of $Co_3O_4$ as a cobalt compound were mixed, stirred and calcined at 1,000° C. for 10 hours to prepare lithium cobalt oxide ($LiCoO_2$).

Step 2 (preparation of a shell): 100 g of the $LiCoO_2$ prepared in step 1 and 2 g of $Li_2CO_3$ as a lithium compound, 4 g of $Co_3O_4$ as a cobalt compound and 0.8 g of MgOH as a metal raw material were mixed, stirred and calcined at 675° C. for 5 hours to prepare positive electrode active material particles (an average particle diameter ($D_{50}$) of 18 μm) which includes a shell having a thickness of 200 nm and is in a form in which magnesium oxide (MgO) is embedded in a surface of $LiCoO_2$. Here, the lithium transition metal oxide, lithium compound, transition metal compound and metal raw material were mixed in a weight ratio of 93.63:1.87:3.75:0.75. The magnesium atoms of the magnesium oxide were included at 0.08 at % with respect to all atoms of the prepared positive electrode active material particles, and the magnesium oxide was included at 0.1 wt % with respect to the total weight of the positive electrode active material particles. In addition, the magnesium oxide had an average particle diameter ($D_{50}$) of 50 nm.

<Comparative Example 1> Preparation of Positive Electrode Active Material in which Surface of Transition Metal Oxide is Coated with Metal Oxide in the Form of Island A positive electrode active material according to Comparative Example 1 was prepared in the same manner as in Example 1 except that the calcination in step 2 of Example 1 was performed at 500° C. for 5 hours. The positive electrode active material had an average particle diameter ($D_{50}$) of 18 μm and included a shell having a thickness of 200 nm. Also, the magnesium atoms of the magnesium oxide were included at 0.08 at % with respect to all atoms of the prepared positive electrode active material particles and the magnesium oxide was included at 0.1 wt % with respect to the total weight of the positive electrode active material particles. In addition, the magnesium oxide had an average particle diameter ($D_{50}$) of 50 nm.

<Comparative Example 2> Preparation of Positive Electrode Active Material in which Metal Oxides are Embedded Inside Transition Metal Oxide in Such a Way that all Metal Oxides are not Exposed to the Outside A positive electrode active material according to Comparative Example 2 was prepared in the same manner as in Example 1 except that the calcination in step 2 of Example 1 was performed at 1,000° C. for 10 hours. The positive electrode active material had an average particle diameter ($D_{50}$) of 18 μm. Also, the magnesium atoms of the magnesium oxide were included at 0.08 at % with respect to all atoms of the prepared positive electrode active material particles and the magnesium oxide was included at 0.1 wt % with respect to the total weight of the positive electrode active material particles. In addition, the magnesium oxide had an average particle diameter ($D_{50}$) of 50 nm.

<Experimental Example 1> Evaluation of Stability of Secondary Battery

Electrical conductivities were measured to evaluate the stability of the positive electrode active materials prepared in Example 1 and Comparative Examples 1 and 2. As described above, as electrical conductivity is lowered, stability (particularly, thermal stability) may be improved. Therefore, stability was evaluated through the measurement of electrical conductivity. A measurement method is as follows. Results are shown in the following Table 1.

Each of the positive electrode active materials according to Example 1 and Comparative Examples 1 and 2 was measured using a powder resistivity measurement device (commercially available from Hantech Co., Ltd.). 5 g of each of the positive electrode active materials was put into a molder having a diameter of 10 mm, and a force of 20 kN was applied to measure electrical conductivity through the device.

TABLE 1

| | Electrical conductivity (S/cm) |
|---|---|
| Example 1 | $6.58 \times 10^{-5}$ |
| Comparative Example 1 | $1.58 \times 10^{-3}$ |
| Comparative Example 2 | $5.82 \times 10^{-4}$ |

As shown in Table 1, it can be seen that electrical conductivity according to Example 1 was significantly lower than electrical conductivities according to Comparative Examples 1 and 2. Also, it can be seen that, in the case of Example 1, since a metal oxide was included in the active material in a state in which the metal oxide was disposed at an appropriate position, electrical conductivity was adjusted to be low, and accordingly, stability may be maintained even at high temperature and in battery-breakdown situations.

Example 2 and Comparative Examples 3 and 4: Manufacture of Battery

Batteries according to Example 2 and Comparative Examples 3 and 4 which include the positive electrode active material particles prepared in Example 1 and Comparative Examples 1 and 2, respectively, were manufactured. Specifically, the positive electrode active material particles are applied on an aluminum foil, followed by rolling and drying to manufacture a positive electrode of a secondary battery. Meanwhile, a porous polyethylene separator was interposed between the positive electrode and a graphite-based negative electrode, and an electrolyte in which $LiPF_6$ was dissolved in an ethylene carbonate solvent at a concentration of 1 M was injected to manufacture a secondary battery.

<Experimental Example 2> Evaluation of Capacity Retention (Lifetime Characteristics) of Secondary Battery In order to evaluate capacity retentions of the secondary batteries according to Example 2 and Comparative Examples 3 and 4, charging and discharging at 0.2 C were performed in a first cycle, and charging at 0.5 C and discharging at 1.0 C were performed in later cycles. Afterward, a percentage of discharging capacity at a fiftieth cycle with respect to discharging capacity at the first cycle was measured. Results are shown in FIG. 3.

As shown in FIG. 3, it can be seen that a capacity retention according to Example 2 is superior to capacity retentions according to Comparative Examples 3 and 4. To this end, it can be seen that since the positive electrode active material particles according to the present invention prevents a metal oxide and an electrolyte from causing a side reaction, capacity retention (lifetime characteristics) is improved.

While exemplary embodiments have been described above in detail, the scope of the present invention is not limited thereto, but encompasses several modifications and improvements by those skilled in the art using basic concepts of embodiments of the present invention defined by the appended claims.

The invention claimed is:

1. Positive electrode active material particles comprising: a core including a first lithium transition metal oxide; and a shell surrounding the core, the shell formed separately onto the formed core, wherein the shell comprises a second lithium transition metal oxide and metal oxide particles and all of the metal oxide particles are embedded in the second lithium transition metal oxide, and at least a part of each of the metal oxide particles is exposed at a surface of the shell, wherein the metal oxide particles have an average particle diameter ($D_{50}$) of 5 to 200 nm, and wherein the shell has a thickness of 100 to 300 nm.

2. The positive electrode active material particles according to claim 1, wherein at least a part of each of the metal oxide particles in the shell is exposed outside the surface of the shell.

3. The positive electrode active material particles according to claim 1, wherein the metal oxide particle is one or more selected from the group consisting of $Al_2O_3$, $TiO_2$, MgO, MnO and ZrO.

4. The positive electrode active material particles according to claim 1, wherein metal atoms of the metal oxide particles are included at 0.01 to 1.0 at % with respect to all atoms of the positive electrode active material particles.

5. The positive electrode active material particles according to claim 1, wherein the metal oxide particles are included at 0.03 to 2.0 wt % with respect to the total weight of the positive electrode active material particles.

6. The positive electrode active material particles according to claim 1, wherein the positive electrode active material particles have an average particle diameter ($D_{50}$) of 5 to 25 μm.

7. The positive electrode active material particles according to claim 1, wherein the first lithium transition metal oxide and the second lithium transition metal oxide are one or more selected from the group consisting of a lithium-cobalt-based oxide, a lithium-manganese-based oxide, a lithium-nickel-manganese-based oxide, a lithium-manganese-cobalt-based oxide and a lithium-nickel-manganese-cobalt-based oxide.

8. The positive electrode active material particles according to claim 1, wherein the first lithium transition metal oxide and the second lithium transition metal oxide are one or more selected from the group consisting of $LiCoO_2$, $LiNiO_2$, $LiMnO_2$, $LiMn_2O_4$, $Li(Ni_aCo_bMn_c)O_2$ (here, $0<a<1$, $0<b<1$, $0<c<1$ and $a+b+c=1$), $LiNi_{1-Y}Co_YO_2$, $LiCo_{1-Y}Mn_YO$, $LiNi_{1-Y}Mn_YO_2$ (here, $0\leq Y<1$), $Li(Ni_aCo_bMn_c)O_4$ (here, $0<a<2$, $0<b<2$, $0<c<2$ and $a+b+c=2$), $LiMn_{2-z}Ni_zO_4$, and $LiMn_{2-z}Co_zO_4$ (here, $0<z<2$).

9. The positive electrode active material particles according to claim 1, wherein an average composition of the first lithium transition metal oxide is the same as an average composition of the second lithium transition metal oxide.

10. A secondary battery comprising a positive electrode coated with a positive electrode mixture including the positive electrode active material particles according to claim 1, a negative electrode coated with a negative electrode mixture including a negative electrode active material, and an electrolyte.

11. A battery module comprising the secondary battery according to claim 10 as a unit cell.

12. A battery pack comprising the battery module according to claim 11 and used as a power source for medium- to large-sized devices.

13. The battery pack according to claim 12, wherein the medium- to large-sized device is selected from the group consisting of an electric vehicle, a hybrid electric vehicle, a plug-in hybrid electric vehicle and a system for power storage.

14. A method of preparing the positive electrode active material particles, the method comprising:
mixing a lithium compound and a transition metal compound and calcining the resulting mixture to prepare a lithium transition metal oxide (step 1); and
mixing the lithium transition metal oxide prepared in step 1, a lithium compound, a transition metal compound and a metal raw material in a weight ratio of 92 to 97:0.5 to 2:2 to 4:0.5 to 2 and calcining the resulting mixture at 550 to 850° C. for 3 to 10 hours (step 2), wherein the formed positive electrode active material particles comprise a core including the lithium transition metal oxide formed in step 1, and a shell surrounding the core formed in step 2, wherein the shell comprises a second lithium transition metal oxide and metal oxide particles which are embedded in the second lithium transition metal oxide, and at least a part of each of the metal oxide particles is exposed at a surface of the shell.

* * * * *